Jan. 5, 1965  R. R. WHEELER  3,163,964
HONING UNIT FOR ROTARY SHAVERS
Filed Jan. 31, 1963  4 Sheets-Sheet 1
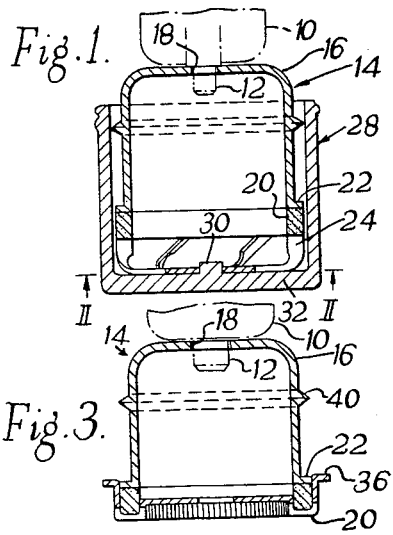
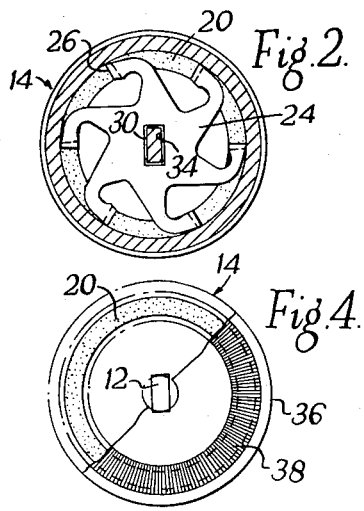
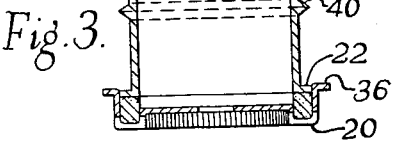
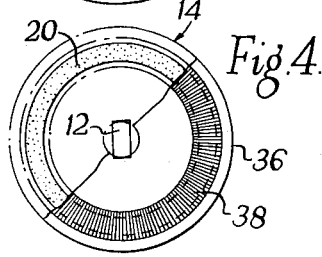
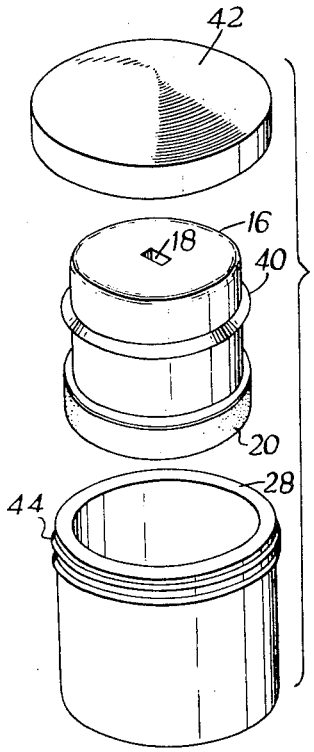
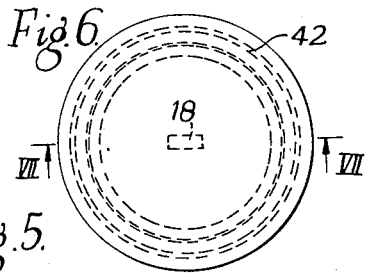
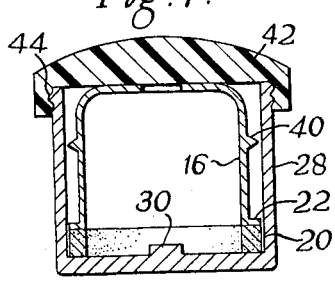
INVENTOR
RAYMOND R. WHEELER
BY
W. A. DRUCKER
ATTORNEY Jan. 5, 1965   R. R. WHEELER   3,163,964
HONING UNIT FOR ROTARY SHAVERS
Filed Jan. 31, 1963   4 Sheets-Sheet 2

RAYMOND R. WHEELER INVENTOR

BY W.A. DRUCKER
ATTORNEY

Jan. 5, 1965 R. R. WHEELER 3,163,964
HONING UNIT FOR ROTARY SHAVERS
Filed Jan. 31, 1963 4 Sheets-Sheet 3
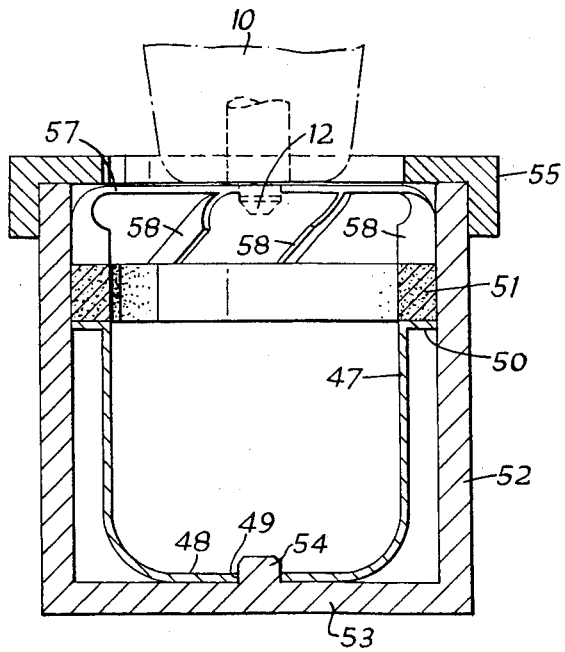
Fig. 11.
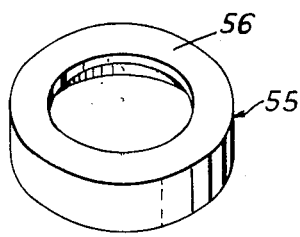
Fig. 12.
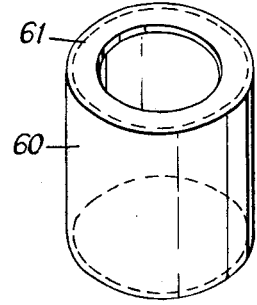
Fig. 13.
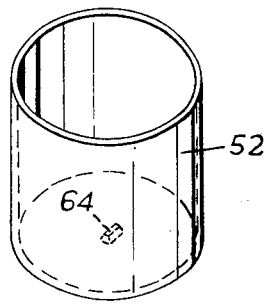
INVENTOR
RAYMOND R. WHEELER
BY
W. A. DRUCKER
ATTORNEY Jan. 5, 1965　　　R. R. WHEELER　　　3,163,964
HONING UNIT FOR ROTARY SHAVERS
Filed Jan. 31, 1963　　　　　　　　　　　　4 Sheets-Sheet 4
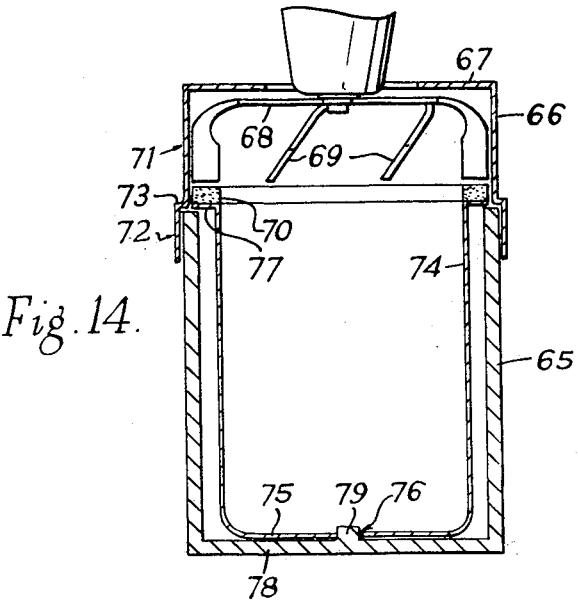
Fig. 14.
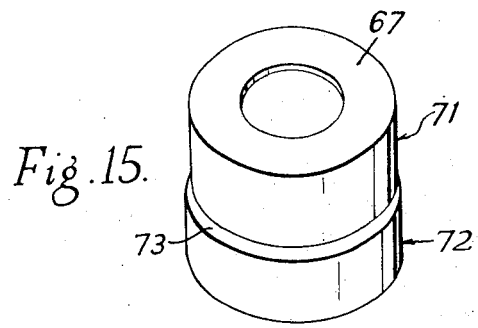
Fig. 15.
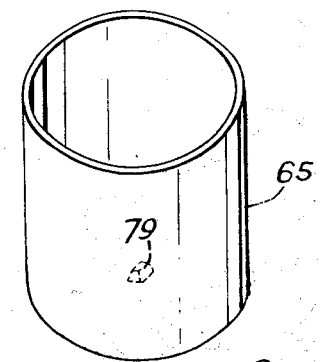
INVENTOR
RAYMOND R. WHEELER
BY
W. A. DRUCKER
ATTORNEY

United States Patent Office 3,163,964
Patented Jan. 5, 1965

3,163,964
HONING UNIT FOR ROTARY SHAVERS
Raymond R. Wheeler, 114 18th St. S., Great Falls, Mont.
Filed Jan. 31, 1963, Ser. No. 255,244
14 Claims. (Cl. 51—125)

This is a continuation-in-part of my co-pending United States patent application No. 54,960 filed September 9, 1960, and entitled "Honing Unit for Rotary Shavers," now abandoned.

The present invention relates to a honing unit which is adapted to sharpen the shaving assembly of a rotary shaver.

An object of the present invention is to provide a honing unit which lends itself to sharpening the spoked rotary cutter or the inner surface of the skin guard associated with said cutter.

Another object of the present invention is to provide a honing unit for a rotary shaver which is simple in structure, one which lends itself to installation upon the shaver head with ease and facility and to detachment from the shaver head with equal ease and facility, and one which is highly effective in action.

These and other objects and advantages of the present invention will be fully apparent from the following description when taken in conjunction with the annexed drawings, in which:

FIGURE 1 is a view in section of the honing unit of the present invention shown attached to the shaft of the shaver motor, the motor being shown partially broken away, the unit being shown in position for honing the spoked rotary shaver;

FIG. 2 is a view taken on the line 2—2 of FIG. 1;

FIG. 3 is a view of the honing unit of the present invention, shown in position honing the inner surface of the skin guard of the shaver;

FIG. 4 is a bottom view of FIGURE 3, with a portion of the skin guard broken away to show the surface of the abrading means;

FIG. 5 is an exploded isometric view of the honing unit of the present invention, shown with a cover to the cup part of the unit positioned below the cup;

FIG. 6 is a top plan view of the honing unit in the assembled condition, and

FIG. 7 is a view taken on the line 7—7 of FIG. 6.

FIG. 11 is a central longitudinal section of another embodiment of honing unit of the present invention.

FIG. 12 is an exploded isometric view of a mounting cup of FIG. 11.

FIG. 13 is an exploded isometric view of a modified form of mounting cup, usable in the same manner as that shown in FIG. 11.

FIG. 14 is a central longitudinal section of yet another embodiment of honing unit of the present invention.

FIG. 15 is an exploded isometric view of the mounting cup and safety retaining cover of FIG. 14.

Figure 8:
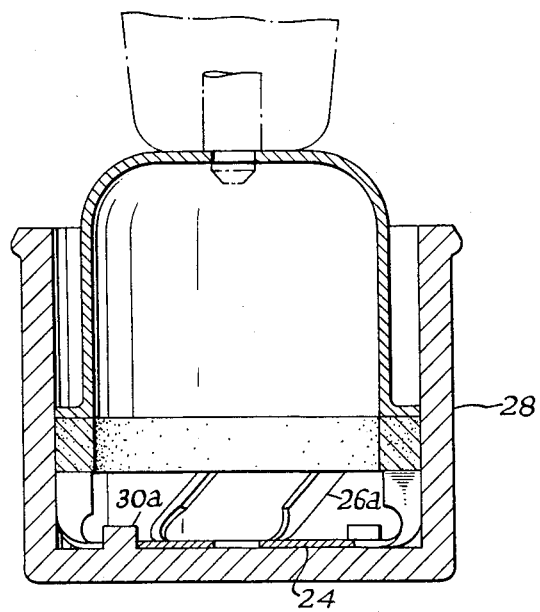
FIG. 8 is a view in section including a first modified construction of cup.

Referring to the drawings in detail, in FIGURES 1 and 3, the reference numeral 10 designates a housing of a shaving mechanism, the housing being open at one end and having a multi-sided rotatable shaft 12 therein with an end portion projecting out of the housing open end. In FIGURES 2 and 4, it will be seen that the projecting end portion of the shaft 12 is rectangular in cross-sectional configuration.

The honing unit of the present invention is designated generally by the reference numeral 14 and it comprises an elongated inverted cup-shaped tool 16 whose base is provided with means for drivingly receiving the projecting end portion of the shaft 12, the means taking the form of a slot 18 conformably shaped to fit the projecting end portion of the shaft 12.

An abrading means which, as shown in FIGURE 1, takes the form of an annular surface ring 20, extends about and is carried by the end of the tool 16 remote from the slot 18 in the base thereof. The ring 20 is fixedly attached to a flange extending outwardly about the rim of the tool. Although the abrading means is shown as a ring, it is to be understood that the outer face of the flange 22 may be provided with an abrading surface.

In FIGURES 1 and 2, a spoked rotary shaver cutter 24, having blade cutting edges 26, is shown in position with the abrading ring 20 simultaneously engaging and sharpening all of its blade cutting edges 26.

In order to accomplish this, a mount in the form of a rigid cup 28 is provided and adapted to be held in the hand of a user, the base 32 of the cup 28 having an internal surface which is flat, as shown in FIGURE 1. Anchoring means, in the form of a projection 30, projects upwardly from the central portion of the internal surface of the cup base 32 and is received in a slot 34 provided in the central portion of the cutter 24. The slot 34 is conformably shaped to fit the shaft 12 when the cutter is mounted upon the shaft 12 for shaving purposes. Therefore, the projection 30 is conformably shaped to the shaft end portion 12.

In FIGURES 3 and 4, the ring 20 is shown honing the inner surface of the skin guard 36 associated with the cutter, the skin guard being slotted as at 38 in FIGURE 4. The skin guard 36 normally permits the whiskers on the face of a user to project through the slots to be cut off by the cutting edges 26 of the cutter 24 when the cutter 24 rotates on the inner surface of the skin guard 36.

The cup 28 is not used in this instance, but the skin guard 36 is held in the hands of the user while the tool 16 rotates with the shaft of the motor of the shaver.

It is to be noted that an annular ring 40 extends about the exterior of the tool 16 intermediate the ends thereof, when the tool 16 is positioned within the cup 28, as shown in FIGURE 1, and the spoked rotary cutter 24 is covered with water or other fluid, and the shaving mechanism is rotated, the ring 40 by virtue of its location below the top edge of the cup 38 serves as a sealing ring to prevent the whirling liquid from rising to or be discharged over the top edge of the cup 28. Also, because of the closeness of the ring 40 so as to contact the inner wall surface of the cup the ring acts to hold the tool against lateral movement with respect to the cup 28 during the honing operation.

In FIGURE 5, the tool 16 is shown removed from the cup 28 with a cover 42 for the cup 28 positioned below the base of the cup 28.

In FIGURES 6 and 7, the unit is shown in a condition of storage with the tool 16 within the cup 28 and the ring 20 resting upon the base of the cup 28. The cover 42 has internal threads engaging threads 44 on the outside of the upper end of the cup 28 for detachably securing the cover 42 in the position totally enclosing the tool 16.

It is to be noted that the internal base surface, the anchoring means, and the internal configuration of the cup 28 render the cup adaptable to self-centeringly support and fixedly hold the spoked rotary cutter 24 so that the cutter rests upon the internal surface of the cup 28 and is fixedly held by the anchoring means and the blade-cutting edges all lying in a common plane perpendicular to the axis of the cup and contiguous to the wall of the cup, as will be apparent by reference to FIGURES 1 and 2.

In FIGURE 8 there is shown a first modified construction in which the cup 28 has anchoring means in the form of two upstanding short cylindrical lugs 30a at spaced positions on the internal surface of the cup bottom 32, these lugs 30a being received between adjacent pairs of spokes 26a of the cutter 24. The cutter 24 is centered and fixedly held in the lower end of the cup and is prevented by the lugs 30a from rotating.

Figure 9:
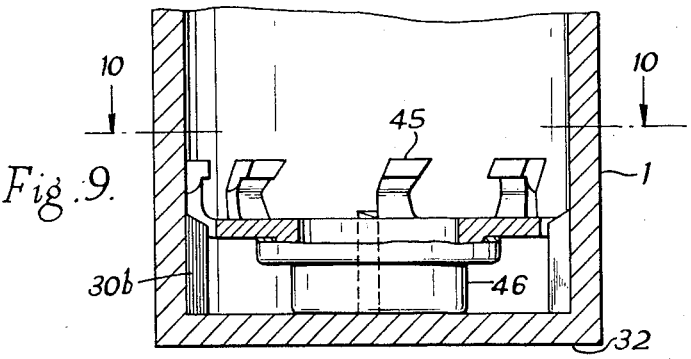
FIG. 9 is a view in section including a second modified construction of cup.
Figure 10:
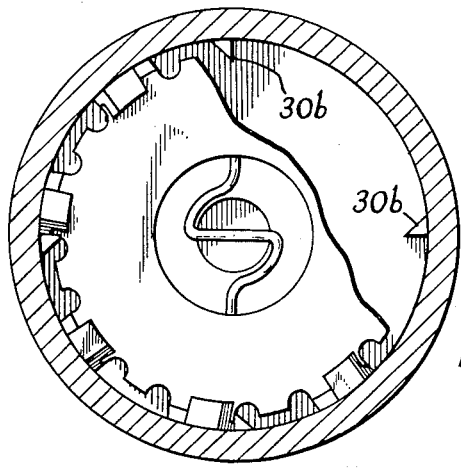
FIG. 10 is a section on the line X—X of FIG. 9.

In FIGURES 9 and 10 there is shown a second modified construction in which the cup 28 has anchoring means in the form of radially-projecting lugs 30b formed on the internal surface of the cup adjacent its base 32, these lugs being received between adjacent pairs of spokes 45 of a modified cutter 46. Here again, the cutter is centered and fixedly held in the lower end of the cup, and is prevented from rotating by the lugs 30b.

In all other respects the modified cups shown in FIG. 8 and in FIGS. 9 and 10 are identical to and used in the same manner as is described above in relation to FIGS. 1 to 7.

The cover cup 42 is fabricated of transparent material, preferably glass, and provided with at least one convex face so that it has a magnifying action when something is viewed therethrough. In FIGURE 6 the slot 18 and the tool 16 are clearly visible through the central portion of the cover 42.

In use, either the cutting edges 26 of the rotary cutter 24 or 46 may be honed, or the inner surface of the skin guard 36 may be honed, as in FIGURES 3 and 4.

The extent to which the edges or the surface has been properly honed may be examined from time-to-time through the magnifying cover 42.

When the unit 14 is to be stored, the cup 28 serves to totally enclose the tool 16 and thereby prevent damage to the ring 20. The cover 42 fits snugly over the upper end of the cup 28 and protects the contents against loss and against accumulative dirt and dust.

Referring now to FIGS. 11 to 13, there is shown an arrangement wherein the housing 10 of the shaving mechanism is open at one end and has a multi-sided rotatable shaft 12 therein with an end portion projecting out of the housing end. The projecting end portion of the shaft 12 is rectangular in cross-sectional configuration.

The honing unit comprises an elongated cup-shaped tool 47 the closed end 48 of which is provided with a multi-sided aperture 49. At its other end, the tool 47 is formed with an externally projecting radial flange 50 on which is secured, by adhesive or otherwise, a ring 51 of abrading material. It will be appreciated by those skilled in this art that the abrading surface, for use in honing the rotary cutter of a shaver, need not be a separate annulus of abrading material secured onto the flange 50 of the tool 47, but could instead be provided as a surface formation of the flange 50.

The tool 47 is a sliding fit within a mounting cup 52 on the base wall 53 of which cup there is provided an upstanding anchoring lug 54 which is of suitable dimensions and correspondingly multi-sided so as to engage into the aperture 49 of the tool 47 and lock said tool against rotation with respect to the cup.

On the upper open end of the mounting cup 52 there is fitted removably a safety retaining cover 55 having a radially inwards directed flange 56 which serves to retain a multi-spoked rotary shaver cutter 57 in the cup, whilst permitting said cutter 57 to rotate with the cutting edge of all its blades 58 in contact with the abrading ring 51. The upper end portion of the circumferential wall of the mounting cup 52, adjacent to its open end, forms a guide for the cutter coaxial with the cup. The cover 55 is made of such dimensions as to be a tight push-fit onto the upper end of the cup, or the interfitting surfaces of the cover 55 and the upper end of the cup could be correspondingly screw-threaded to permit engagement of the cover onto the cup by relative rotation.

The rotary shaver cutter 57 has centrally a multi-sided aperture 59 which is of such dimensions and shaping as to correspond to and receive the multi-sided rotatable shaft 12, whereby the cutter 57 is rotated by the motor of the shaver.

Referring now to FIG. 13, there is shown a modified form of mounting cup wherein a side wall portion 60 is formed integrally with an inwardly directed radial flange 61 at its upper end, this flange 61 serving the same purpose as the flange 56 of FIG. 11. The base wall 62 is made removable and is integrally formed with a short peripheral wall 63 to form a cap which can be secured onto the lower end of the cup 60, either as a relatively stiff push-fit or by correspondingly threading the internal surface of the wall 63 and the external surface of the lower end of the wall of the cup 60. Centrally the base wall 62 has an upstanding multi-sided anchoring lug 64 to be received into the corresponding multi-sided aperture 49 of the tool 47. Part of the cup wall, adjacent the flange 61, forms a guide for the cutter.

In the construction described with reference to FIGS. 10 to 12, the abrading surface or ring, acting as a hone, is held stationary within the cup, whilst the rotary shaver cutter 57 is spun by the motor of the shaver. The holder 47, with its abrading surface or ring, can be removed when required from the cup and the abrading surface or ring refaced when necessary to provide a true abrading surface.

The tool 47, when removed from the cup, can be inverted and engaged by its aperture 49 on the multi-sided shaft 12 of the driving motor of the razor, thereby to permit use of the abrading surface or ring for honing of the inner surface of the usual skin guard of the shaver, as described in detail with reference to FIG. 3.

The flange 56 of FIGS. 11 and 12, and the corresponding flange 61 of FIG. 13, prevents the spinning cutter 57 from flying out of proper position and avoids danger to the user.

The arrangement described with reference to FIGS. 11 to 13 has the advantage that the same anchoring means, for the tool, would be used in all models regardless of the system of drive engagement provided between the driving shaft of the razor and the spoked cutter. This permits a single embodiment of tool to be used with different models of razor; further, with different models of razor, so long as the spoked rotary cutter is at least of the same outside diameter, the same mounting cup and safety cap thereon can be utilized, although a modified tool and abrading ring might be needed.

Referring now to FIGS. 14 and 15 there is shown yet another embodiment having a mounting cup 65 on the open upper end of which there is fitted removably a safety retaining cover 66 having a radially inwards directed flange 67 which serves to receive a multi-spoked rotary shaver cutter 68, the cutting edge of all the blades 69 of the cutter being in contact with an abrading ring 70. The cover 66 is formed with an upper cylindrical guide-forming wall 71 of lesser diameter, and a lower cylindrical wall 72 of greater diameter, separated by a shoulder 73. The lower cylindrical wall 72 is made of such dimensions as to be a tight push-fit externally onto the upper end of the mounting cup 65, or the inter-engaging surfaces of the wall 72 and mounting cup 65 could be correspondingly screw-threaded.

A honing unit consists of an elongated cup-shaped tool 74 the closed end 75 of which is provided with a multi-sided aperture 76. At its other end the tool 74 is formed with an externally projecting radial flange 77 on which the abrading ring 70 is mounted by adhesive or otherwise. The tool 74 is a sliding fit within the mounting cup 65, the latter having on its base wall 78 an upstanding multi-sided anchoring lug 79 to engage into the multi-sided aperture 76 of the tool to lock the tool against rotation with respect to the cup.

In this embodiment, the flange 77 carrying the abrading ring 70 lies beyond the open upper end of the cup 65, whereby abrading rings of greater external diameter than the internal diameter of the cup may be used with the latter. The upper wall 71 of the retaining cover 66 is suitably dimensioned to form a guide for the rotary cutter 68, and it will be seen that by making a number of different retaining covers 66 each having a lower wall 72 of the same requisite diameter but with their upper wall 71 of a diaemter to suit a particular cutter, the same mounting cup 65 may be utilized in conjunction with cutters 68 and abrading rings 70 of different diameters. In this embodiment the cover 66 guides and centers the cutter 68, as distinct from the embodiment of FIGS. 11, 12, 13 wherein the cup 52 guides the cutter 57.

I claim:

1. A honing unit comprising a mount embodying a rigid upstanding cup adapted to be fixedly held in the hand of a user, anchoring means projecting from the internal surface of said cup, the anchoring means, and the internal configuration of said cup self-centeringly supporting and holding a spoked rotary shaver cutter so that the shaver cutter rests within the cup with the blade-cutting edges all lying in a common plane perpendicular to the axis of said cup and adjacent to the wall of said cup, an elongated cup-shaped tool provided with means for receiving a projection, and an annular abrading surface projecting from and carried by said tool, said tool being disposed within said cup so that the abrading surface simultaneously engages said blade-cutting edges when a spoked rotary shaver cutter is self-centeringly supported within said cup.

2. A honing unit comprising a mount embodying a rigid upstanding cup adapted to be fixedly held in the hand of a user, said cup having a base internal surface, anchoring means projecting from the internal surface of said cup the internal base surface, the anchoring means, and the internal configuration of said cup self-centeringly supporting a spoked rotary shaver cutter within said cup with the blade-cutting edges all lying in a common plane perpendicular to the axis of said cup and adjacent to the wall of said cup, an elongated cup-shaped tool provided with an annular abrading surface projecting from and carried by said tool, said tool being disposed within said cup so that the abrading surface simultaneously engages said blade-cutting edges when a spoked rotary shaver cutter is self-centeringly supported within said cup.

3. A honing unit comprising a mount embodying a rigid upstanding cup adapted to be fixedly held in the hand of a user, said cup having a base whose internal surface is flat, anchoring means projecting from the internal surface of said cup, the internal base surface, the anchoring means, and the internal configuration of said cup self-centeringly supporting and fixedly holding a spoked rotary shaver cutter so that the shaver cutter rests upon the internal surface of the cup base with the shaver cutter fixedly held by said anchoring means and the blade-cutting edges of said cutter all lying in a common plane perpendicular to the axis of said cup and contiguous to the wall of said cup, an elongated inverted cup-shaped tool whose base is provided centrally with means receiving the projecting end portion of a rotatable shaft, and an annular abrading surface projecting from and carried by the open end of said tool, said tool being disposed within said cup so that the abrading surface simultaneously engages said blade-cutting edges when a spoked rotary shaver cutter is self-centeringly supported and fixedly held within said cup.

4. A honing unit comprising a mount embodying a rigid upstanding cup adapted to be fixedly held in the hand of a user, said cup having a base whose internal surface is flat, anchoring means projecting from the internal surface of said cup; the internal base surface, the anchoring means, and the internal configuration of said cup self-centeringly supporting and fixedly holding a spoked rotary shaver cutter so that the shaver cutter rests upon the internal surface of the cup base with the shaver cutter fixedly held by said anchoring means and the blade-cutting edges of said cutter all lying in a common plane perpendicular to the axis of said cup and contiguous to the wall of said cup, an elongated inverted cup-shaped tool whose base is provided centrally with means receiving the projecting end portion of a rotatable shaft, and an annular abrading surface projecting from and carried by the open end of said tool, said tool being disposed within said cup so that the abrading surface simultaneously engages said blade-cutting edges when a spoked rotary shaver cutter is self-centeringly supported and fixedly held within said cup.

5. A honing unit comprising a mount embodying a rigid upstanding cup adapted to be fixedly held in the hand of a user, said cup having a base whose internal surface is flat, anchoring means projecting from the internal surface of said cup, the internal base surface, the anchoring means, and the internal configuration of said cup self-centeringly supporting and fixedly holding a spoked rotary shaver cutter so that the shaver cutter rests upon the internal surface of the cup bottom with the shaver cutter fixedly held by said anchoring means and the blade-cutting edges of said cutter all lying in a common plane perpendicular to the axis of said cup and contiguous to the wall of said cup, an elongated inverted cup-shaped tool whose base is provided centrally with means receiving the projecting end portion of a rotatable shaft, and an annular abrading surface projecting from and carried by the open end of said tool, said tool being disposed within said cup so that the abrading surface simultaneously engages said blade-cutting edges when a spoked rotary shaver cutter is self-centeringly supported and fixedly held within said cup.

6. A honing unit comprising a mount embodying a rigid upstanding cup adapted to be fixedly held in the hand of a user, said cup having a base whose internal surface is flat, anchoring means projecting from the internal surface of the cup, the internal base surface, the anchoring means, and the internal configuration of said cup supporting self-centeringly and fixedly holding a spoked rotary shaver cutter so that the shaver cutter rests upon the internal surface of the cup base with the shaver cutter fixedly held by said anchoring means and the blade cutting edges of said cutter all lying in a common plane perpendicular to the axis of said cup and contiguous to the wall of said cup, an elongated inverted cup-shaped tool whose base is provided centrally with means receiving the projecting end portion of a rotatable shaft, and an annular abrading surface projecting from and carried by the open end of said tool, said tool being disposed within said cup so that the abrading surface simultaneously engages said blade-cutting edges when a spoked rotary shaver cutter is self-centeringly supported and fixedly held within said cup.

7. The honing unit according to claim 1 which includes in addition a ring projecting about the external surface of said tool intermediate the base and abrading surface thereof and contactable with the wall of said cup for holding the tool against lateral movement with respect to said cup.

8. A honing unit comprising a mount embodying a rigid upstanding cup adapted to be firmly held in the hand of a user, anchoring means projecting from the internal surface of said cup, an elongated cup-shaped tool provided with means for receiving the anchoring means of the cup thereby to lock the tool against rotation with respect to the cup, a coaxial circumferential guide wall adjacent the open end of the cup, the tool being disposed within the cup with an abrading surface exposed for engagement by blade cutting edges of a rotary shaver cutter when such a cutter is disposed within the guide wall.

9. A honing unit comprising a mount embodying a rigid upstanding cup adapted to be firmly held in the hand of a user, said cup including a guide-forming wall portion adjacent its open end, anchoring means projecting from the internal surface of said cup, an elongated cup-shaped tool provided with means for receiving the anchoring means of the cup locking the tool against rotation with respect to the cup, an annular abrading surface projecting from and carried by said tool, said tool being disposed within said cup with the abrading surface exposed towards the open end of said cup for engagement by the blade cutting edges of a spoked rotary shaver cutter when such a cutter is disposed within the guide-forming wall portion adjacent the open end of the cup, 10. A honing unit comprising a mount embodying a rigid upstanding cup adapted to be firmly held in the hand of a user, said cup including a guide-forming wall portion adjacent its own end, anchoring means projecting from the internal surface of said cup, an elongated cup-shaped tool provided with means for receiving the anchoring means of the cup locking the tool against rotation with respect to the cup, an annular abrading surface projecting from and carried by said tool, said tool being disposed within said cup with the abrading surface exposed towards the open end of said cup for engagement by the blade cutting edges of a spoked rotary shaver cutter when such a cutter is disposed within the guide-forming wall portion adjacent the open end of the cup, and retaining means projecting radially inwards at the open end of the cup to engage the rotary shaver cutter and prevent said cutter from passing axially out of the open end of the cup.

11. A honing unit comprising a mount embodying a rigid upstanding cup adapted to be firmly held in the hand of a user, said cup including a guide-forming wall portion adjacent its open end, anchoring means projecting from the internal surface of said cup, an elongated cup shaped tool provided with means for receiving the anchoring means of the cup, locking the tool against rotation with respect to the cup, an annular abrading surface projecting from and carried by said tool, said tool being disposed within said cup with the abrading surface exposed towards the open end of said cup for engagement by the blade cutting edges of a spoked rotary shaver cutter when such a cutter is disposed within the guide-forming wall portion adjacent the open end of the cup, and a cap releasably engaged on the open end of the cup, said cap being centrally apertured and including a radially inwardly directed flange to engage the rotary shaver cutter and prevent said cutter from passing axially out of the open end of the cup.

12. A honing unit comprising a mount embodying a rigid upstanding cup adapted to be firmly held in the hand of a user, said cup including a guide-forming wall portion adjacent its open end, said cup including a base portion and an upper portion releasably engaged on said base portion, anchoring means projecting from the internal surface of the base portion of said cup, an elongated cup shaped tool provided with means for receiving the anchoring means of the base portion of the cup, locking the tool against rotation with respect to the cup, an annular abrading surface projecting from and carried by said tool, said tool being disposed within said cup with the abrading surface exposed towards the open end of said cup for engagement by the blade cutting edges of a spoked rotary shaver cutter when such a cutter is disposed within the guide-forming wall portion adjacent the open end of the cup, and a radially inwardly directed flange integrally formed on said upper portion of the cup at its open end to engage the rotary shaver cutter and prevent said cutter from passing axially out of the open end of the cup.

13. A honing unit comprising a mount embodying a rigid upstanding cup adapted to be firmly held in the hand of a user, anchoring means projecting from the internal surface of said cup, an elongated cup-shaped tool provided with means for receiving the anchoring means of the cup locking the tool against rotation with respect to the cup, a member releasably engaged on the open end of the cup and including a circumferential guide-forming wall portion coaxial with the cup, the tool being disposed in the cup with its abrading surface exposed towards the open end of the cup for engagement by blade cutting edges of a rotary shaver cutter when such a cutter is disposed within the guide-wall forming portion.

14. A honing unit comprising a mount embodying a rigid upstanding cup adapted to be firmly held in the hand of a user, anchoring means projecting from the internal surface of said cup, an elongated cup-shaped tool provided with means for receiving the anchoring means of the cup locking the tool against rotation with respect to the cup, a retaining cap releasably engaged on the open end of the cup, said cap including a circumferential guide-forming wall portion coaxial with the cup, said cap further including a radially inwards directed flange at that end of the guide-forming wall portion remote from the cup, the tool being disposed in the cup with its abrading surface exposed towards the open end of the cup for engagement by blade cutting edges of a rotary shaver cutter when such a cutter is disposed within said guide-forming wall portion and between said flange and the cup.

References Cited in the file of this patent

UNITED STATES PATENTS

| | | |
|---|---|---|
| 996,398 | Buttler | June 27, 1911 |
| 1,644,778 | Gibson | Oct. 11, 1927 |
| 1,758,915 | Aaron | May 20, 1930 |
| 2,114,919 | Evans | Apr. 19, 1938 |
| 2,355,763 | Wahl | Apr. 15, 1944 |
| 2,391,701 | Heller | Dec. 25, 1945 |
| 2,857,718 | Johnston | Oct. 28, 1958 |
| 2,953,851 | Wheeler | Sept. 27, 1960 |

FOREIGN PATENTS

| | | |
|---|---|---|
| 200,028 | Austria | Oct. 10, 1958 |
| 640,782 | Canada | May 8, 1962 |